United States Patent
Ravichandran et al.

(10) Patent No.: US 12,084,043 B2
(45) Date of Patent: Sep. 10, 2024

(54) SYSTEM AND METHOD FOR RESTARTING AN ENGINE

(71) Applicant: Ford Global Technologies, LLC, Dearborn, MI (US)

(72) Inventors: Maruthi Ravichandran, Dearborn, MI (US); Alec Bolthouse, Dearborn, MI (US); Francis Thomas Connolly, Ann Arbor, MI (US); Minku Lee, Canton, MI (US); Fazal Urrahman Syed, Canton, MI (US); Daniel Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 17/659,278

(22) Filed: Apr. 14, 2022

(65) Prior Publication Data

US 2023/0331213 A1    Oct. 19, 2023

(51) Int. Cl.
| | |
|---|---|
| *B60W 20/40* | (2016.01) |
| *B60W 20/20* | (2016.01) |
| *B60W 30/18* | (2012.01) |
| *B60W 50/08* | (2020.01) |
| *B60W 50/10* | (2012.01) |

(52) U.S. Cl.
CPC ............ *B60W 20/40* (2013.01); *B60W 20/20* (2013.01); *B60W 30/18109* (2013.01); *B60W 50/082* (2013.01); *B60W 50/10* (2013.01); *B60W 2510/083* (2013.01); *B60W 2510/085* (2013.01)

(58) Field of Classification Search
CPC ................ B60W 20/40; B60W 20/20; B60W 30/18109; B60W 50/082; B60W 50/10; B60W 2510/083; B60W 2510/085
See application file for complete search history.

(56) References Cited

U.S. PATENT DOCUMENTS

| | | | |
|---|---|---|---|
| 6,436,005 B1 * | 8/2002 | Bellinger | F02D 41/2422 477/110 |
| 8,594,913 B2 | 11/2013 | Steuernagel | |
| 9,731,710 B2 | 8/2017 | Gibson et al. | |
| 10,272,907 B2 | 4/2019 | Johri et al. | |
| 10,450,979 B2 | 10/2019 | Gibson et al. | |
| 2013/0291830 A1 * | 11/2013 | Doering | B60W 10/10 123/350 |
| 2013/0296121 A1 | 11/2013 | Gibson et al. | |

(Continued)

FOREIGN PATENT DOCUMENTS

DE    102010060681 A1    5/2012

OTHER PUBLICATIONS

Ravichandran, M. et al., "Methods and System for Starting an Engine," U.S. Appl. No. 17/443,925, filed Jul. 28, 2021, 35 pages.

(Continued)

*Primary Examiner* — Erez Gurari
(74) *Attorney, Agent, or Firm* — David Kelley; McCoy Russell LLP

(57) ABSTRACT

Systems and methods for operating a hybrid vehicle are presented. In one example, an integrated starter/generator (ISG) provides torque to restart an engine after the engine has been shut down and before engine speed is zero. An opening of a throttle is delayed to reduce driveline torque disturbances during engine restarting.

20 Claims, 4 Drawing Sheets

(56) References Cited

U.S. PATENT DOCUMENTS

| | | | |
|---|---|---|---|
| 2013/0296124 A1* | 11/2013 | Pietron | B60K 6/26 |
| | | | 180/65.265 |
| 2013/0296136 A1* | 11/2013 | Doering | B60W 30/18018 |
| | | | 477/174 |
| 2013/0297157 A1* | 11/2013 | Pietron | B60W 10/08 |
| | | | 477/62 |
| 2014/0046529 A1* | 2/2014 | Gibson | F02N 11/00 |
| | | | 701/22 |
| 2014/0100082 A1* | 4/2014 | Gibson | F02N 19/005 |
| | | | 477/181 |
| 2016/0236677 A1 | 8/2016 | Doering et al. | |
| 2017/0259808 A1* | 9/2017 | Makled | B60W 10/02 |
| 2017/0259810 A1 | 9/2017 | Zhang et al. | |
| 2017/0282908 A1* | 10/2017 | Pietron | B60W 20/00 |
| 2018/0306157 A1 | 10/2018 | Lee et al. | |
| 2018/0340503 A1 | 11/2018 | Kim | |
| 2019/0195155 A1* | 6/2019 | Jerger | F02N 11/0814 |
| 2019/0376483 A1 | 12/2019 | Khafagy et al. | |
| 2020/0047744 A1* | 2/2020 | Shokaku | B60W 50/06 |
| 2020/0080527 A1 | 3/2020 | Khafagy et al. | |
| 2020/0216057 A1* | 7/2020 | Blue | B60W 10/26 |

OTHER PUBLICATIONS

Ravichandran, M. et al., "Methods and System for Controlling an Engine," U.S. Appl. No. 17/449,209, filed Sep. 28, 2021, 42 pages.
Ravichandran, M. et al., "Methods and System for Reserving Torque for Engine Starting," U.S. Appl. No. 17/449,216, filed Sep. 28, 2021, 41 pages.

\* cited by examiner

SYSTEM AND METHOD FOR RESTARTING AN ENGINE

FIELD

The present description relates to methods and a system for restarting an engine that has entered a shutdown phase. The methods and system may be applied to hybrid vehicles that include an integrated starter/generator.

BACKGROUND AND SUMMARY

An engine of a hybrid vehicle may be shut off from time to time to conserve fuel. The hybrid vehicle may also include an integrated starter/generator (ISG). The ISG may augment engine torque output and the ISG may also be used to crank or rotate the engine so that the engine may be started. The engine may be rotated or assisted via the ISG when a driveline disconnect clutch is closed. However, closing the driveline disconnect clutch during some conditions may result in driveline torque disturbances.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
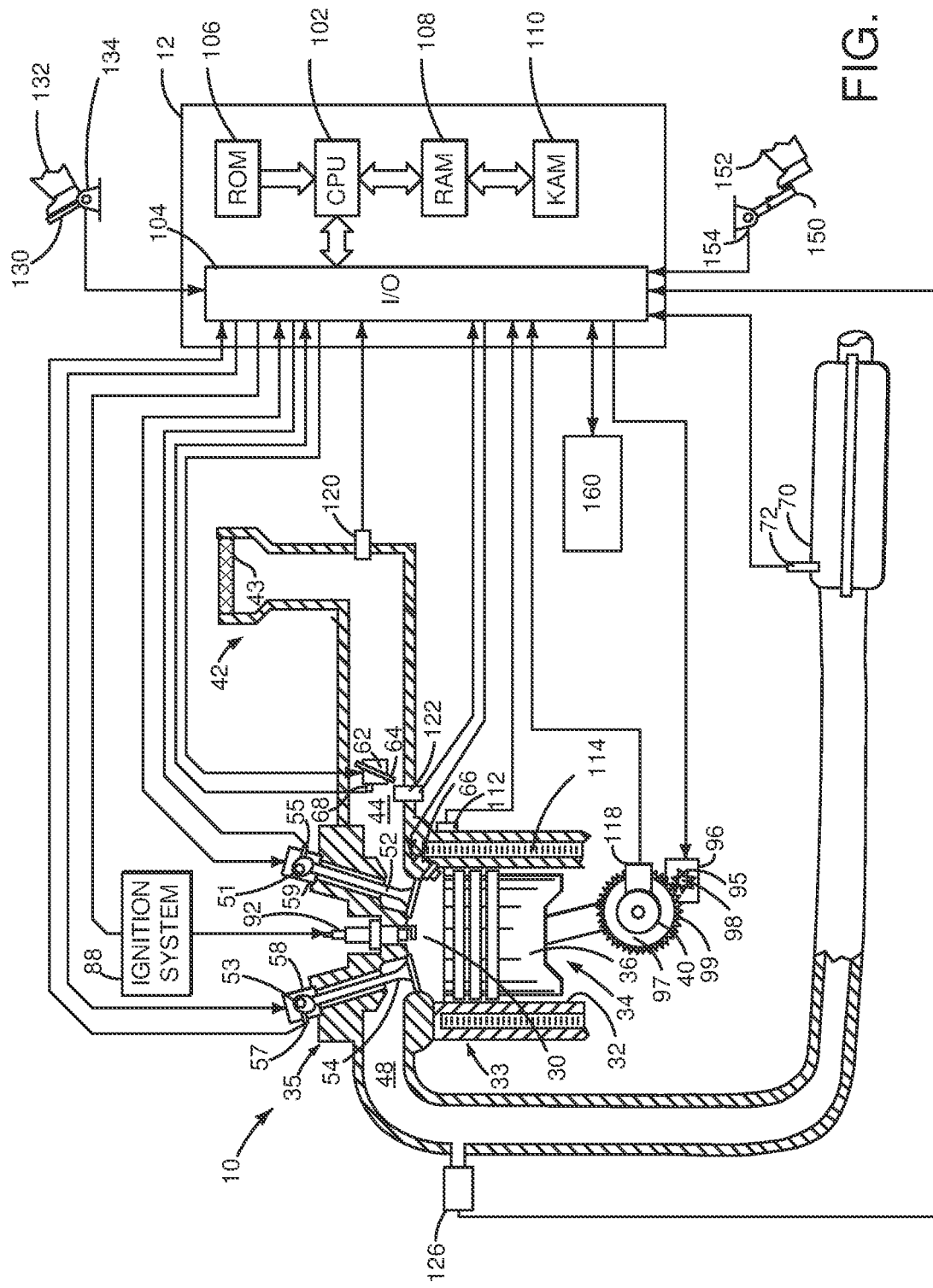
FIG. 1 is a schematic diagram of an engine.
Figure 2:
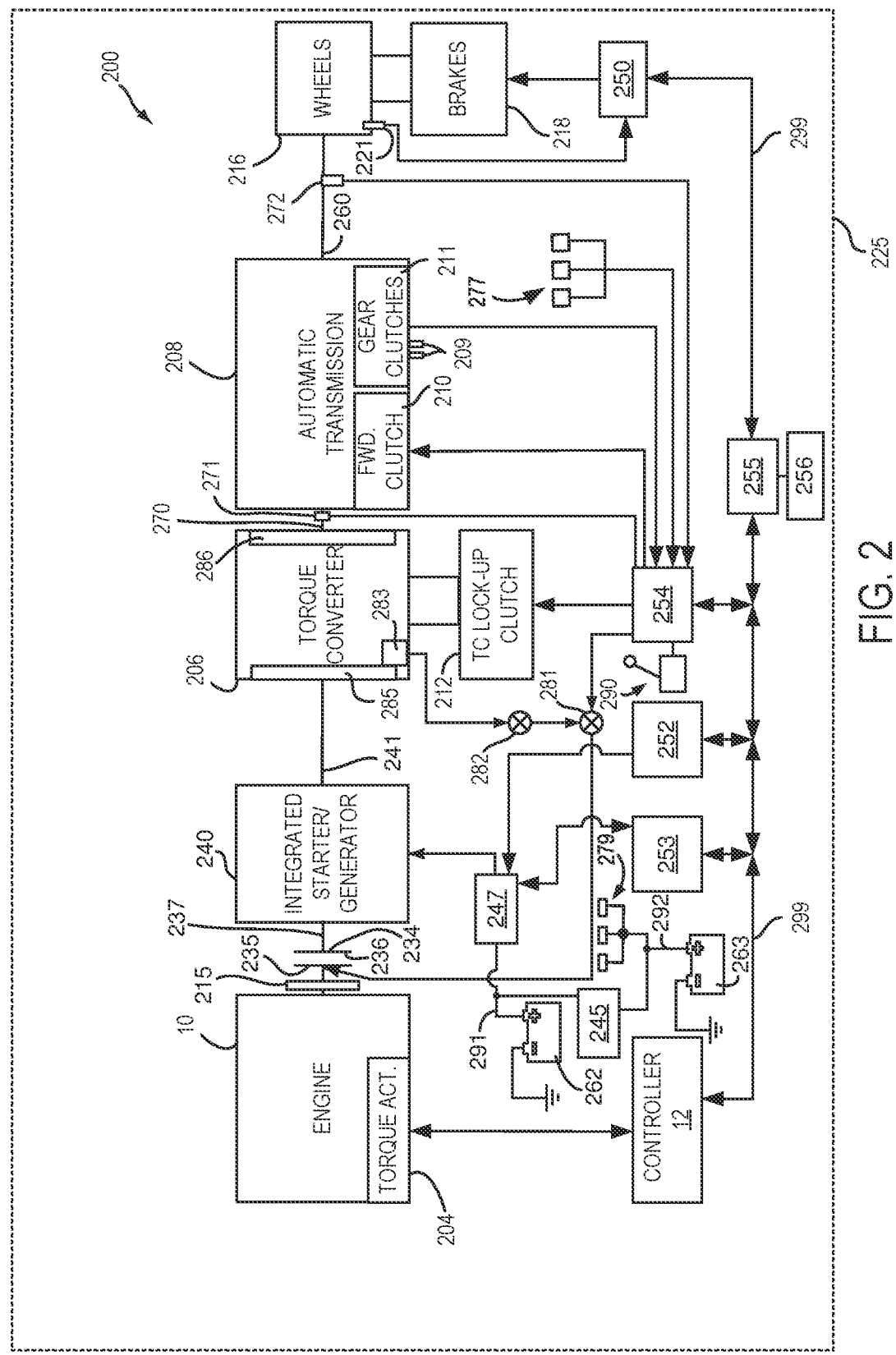
FIG. 2 is a schematic diagram of a hybrid vehicle driveline including the engine of FIG. 1.
Figure 3:
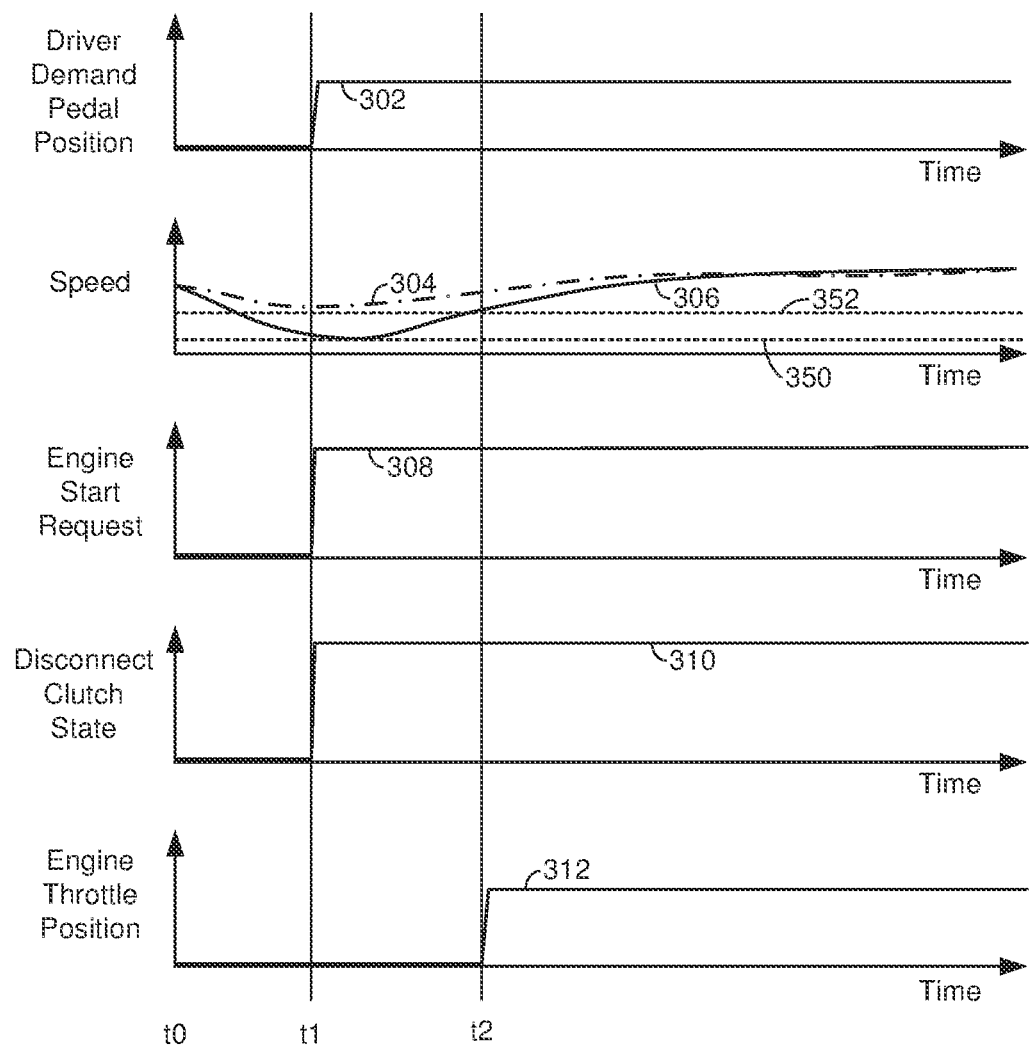
FIG. 3 shows an example engine restarting sequence according to the method of FIG. 4.

The present description is related to improving restarting of an engine that has started to shut down. The engine may be included in a hybrid vehicle that includes an integrated starter/generator (ISG). The ISG may supply torque to rotate the engine if an engine start is requested after an engine is shut down and before the engine stops rotating. The engine may be of the type that is shown in FIG. 1. The engine may be part of a hybrid powertrain or driveline as shown in FIG. 2. The engine may be restarted as shown in the sequence of FIG. 3. The engine may be shut down and restarted according to the method of FIG. 4.

An engine of a hybrid vehicle may be stopped during conditions of low driver demand to conserve energy. For example, when a driver releases a driver demand pedal and applies a brake pedal as a vehicle approaches a stop light, the vehicle's engine may be stopped (e.g., stop rotation and combustion) to reduce fuel consumption and the vehicle's ISG may be stopped to reduce electric power consumption. After an engine stop has been requested and before an engine restart is requested, the engine may be shut down by ceasing fuel flow and spark to the engine's cylinders. The engine's inertia allows the engine to continue rotating for a period of time after fuel flow to the engine's cylinders has ceased. During the period of time that the engine is rotated without being fueled, vehicle systems or the vehicle's operator may cause an engine start request to be generated. Since the engine is rotating, engaging the engine's starter may cause flywheel wear. However, the engine may be restarted via closing a driveline disconnect clutch and rotating the engine via the ISG. If the ISG is coupled to the engine when engine speed is in a range where there is a resonant frequency of the engine, the driveline may be subject to unwanted torque oscillations.

The inventors herein have recognized the above-mentioned issues and have developed a method for operating a vehicle, comprising: shutting down an engine via a controller in response to an engine shutdown request; at least partially closing a driveline disconnect clutch and transferring torque from an integrated starter/generator to the engine after the engine shutdown request and before engine speed reaches zero following the engine shutdown request; and delaying an opening of an engine throttle while a speed of the engine is less than a threshold engine speed as the engine is being rotated via an integrated starter/generator.

By delaying opening of an engine throttle in response to an engine start request after an engine has been shut down, it may be possible to provide the technical result of improving engine restarting after engine shutdown has commenced. Specifically, by maintaining the engine throttle in a closed position, engine starting torque may be changed such that engine torque pulsations may be less noticeable during an engine speed range where the engine has a resonant frequency.

The present description may provide several advantages. In particular, the approach may improve restarting of an engine that has been shut down. Further, the approach may reduce driveline component degradation. Additionally, the approach may reduce a magnitude of driveline torque disturbances.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 (e.g., gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and friction brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from rotor and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, ISG temperature sensors, gear shift lever sensors, and an ambient temperature sensor. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: a vehicle including an engine; an integrated starter/generator (ISG); a driveline disconnect clutch positioned in a driveline between the engine and the ISG; and a controller including executable instructions stored in non-transitory memory that cause the controller to rotate the engine via the ISG and delay an opening of a throttle in response to an engine start request, the engine start request generated after ceasing fuel flow to the engine and before an engine speed is zero. In a first example, the system includes where the opening of the throttle is delayed beginning at a time when the engine start request is initially asserted. In a second example that may include the first example, the system includes where the delay is based on a driver urgency metric. In a third example that may include one or both of the first and second examples, the system includes where the delay is based on engine speed. In a fourth example that may include one or more of the first through third examples, the system includes where the delay is a function of transmission fluid temperature. In a fifth example that may include one or more of the first through fourth examples, the system further comprises opening the throttle in response to the engine speed. In a sixth example that may include one or more of the first through fifth examples, the system includes where opening the throttle is performed when the engine speed exceeds a threshold speed.

Referring now to FIG. 3, a prophetic driveline operating sequence is shown. The operating sequence of FIG. 3 may be provided via the system of FIGS. 1 and 2 in cooperation with the method of FIG. 4. The vertical lines at times t0-t2 represent times of interest during the operating sequence. The plots are time aligned.

The first plot from the top of FIG. 3 is a plot of a driver demand pedal position versus time. The vertical axis represents the driver demand pedal position and the driver demand pedal position increases in the direction of the vertical axis arrow. The driver demand pedal position increases farther as the driver demand pedal is applied. The horizontal axis represents time and time increases from the left side of the plot to the right side of the plot. Trace 302 represents the driver demand pedal position.

The second plot from the top of FIG. 3 is a plot of rotational speed versus time. The vertical axis represents rotational speed and rotational speed increases in the direction of the vertical axis arrow. The horizontal axis represents time and time increases from the left side of the plot to the right side of the plot. Trace 304 represents a rotational speed of a torque converter impeller. Trace 306 represents a rotational speed of an internal combustion engine. Lower threshold 350 (e.g., horizontal line) represents lower limit an engine speed range where the engine or the engine and the dual mass flywheel exhibit a resonant frequency. Upper threshold 352 (e.g., horizontal line) represents an upper limit of the engine speed range where the engine or the engine and the dual mass flywheel exhibit a resonant frequency.

The third plot from the top of FIG. 3 is a plot of an engine start request state versus time. The engine start request in this example is based on a change of mind. The change of mind may be a term of art for a condition that causes an engine that has been shut down, but has not reached zero rotational speed after being shut down, to be restarted. An engine shutdown occurs when fuel, or fuel and spark, delivery to the engine has been ceased. The engine may continue to rotate even though the engine has been shut down. The engine start request is asserted when trace 308 is at a higher level that is near the vertical axis arrow. The engine start request is not asserted when trace 308 is at a lower level that is near the horizontal axis.

The fourth plot from the top of FIG. 3 is a plot of a driveline disconnect clutch state versus time. The vertical axis represents the driveline disconnect clutch state and the driveline disconnect clutch is closed when trace 310 is at a higher level near the vertical axis arrow. The driveline disconnect clutch is fully open when trace 310 is at a lower level near the horizontal axis. Trace 310 represents the driveline disconnect clutch state.

The fifth plot from the top of FIG. 3 is a plot of an engine throttle position versus time. The vertical axis represents the engine throttle position and the engine throttle opening amount increases in the direction of the vertical axis arrow. The engine throttle is fully closed when trace 312 is at a level of the horizontal axis. The horizontal axis represents time and time increases from the left side of the plot to the right side of the plot. Trace 312 represents the engine throttle position.

At time t0, the engine (not shown) is shut down and driver demand pedal position is zero. The engine speed and torque converter impeller speed are declining due to the engine being shut down. The engine start request is not asserted and the driveline disconnect clutch is open. The engine throttle is fully closed. Spark and fuel (not shown) are not supplied to the engine since the engine is shut down.

Between time t0 and time t1, the driver demand pedal is not applied and the engine speed falls into the engine resonance frequency region bounded by lower threshold 350 and upper threshold 352. The engine start request is not asserted and the driveline disconnect clutch remains open. The engine throttle remains closed.

At time t1, the driver demand pedal position is increased, which causes an engine start request to be generated. Since engine speed is below threshold 352, the engine throttle position is not increased in response to the increased driver demand increasing. The engine throttle position adjustment is delayed and the throttle opening delay period begins at time t1. Opening of the engine throttle is delayed so that engine torque may be reduced. Reducing the engine torque may help to reduce a possibility of exciting the engine and flywheel resonance frequencies. The engine (not shown) is cranked (e.g., rotated) via the ISG (not shown) in response to the engine start request. In addition, fuel and spark are supplied to the engine.

At time t2, engine speed exceeds upper threshold 352 so the engine throttle position is increased, thereby increasing engine air flow and engine torque. The driver demand pedal position remains unchanged and engine speed and torque converter impeller speed continue to increase. The driveline disconnect clutch remains closed.

In this way, the opening of the throttle may be delayed and then adjusted to a position that is based on the driver demand. By delaying opening of the throttle, engine speed may increase above an engine speed region where resonance frequencies of the engine and dual mass flywheel may be excited. Accordingly, a smoother engine restart may be provided.

Figure 4:
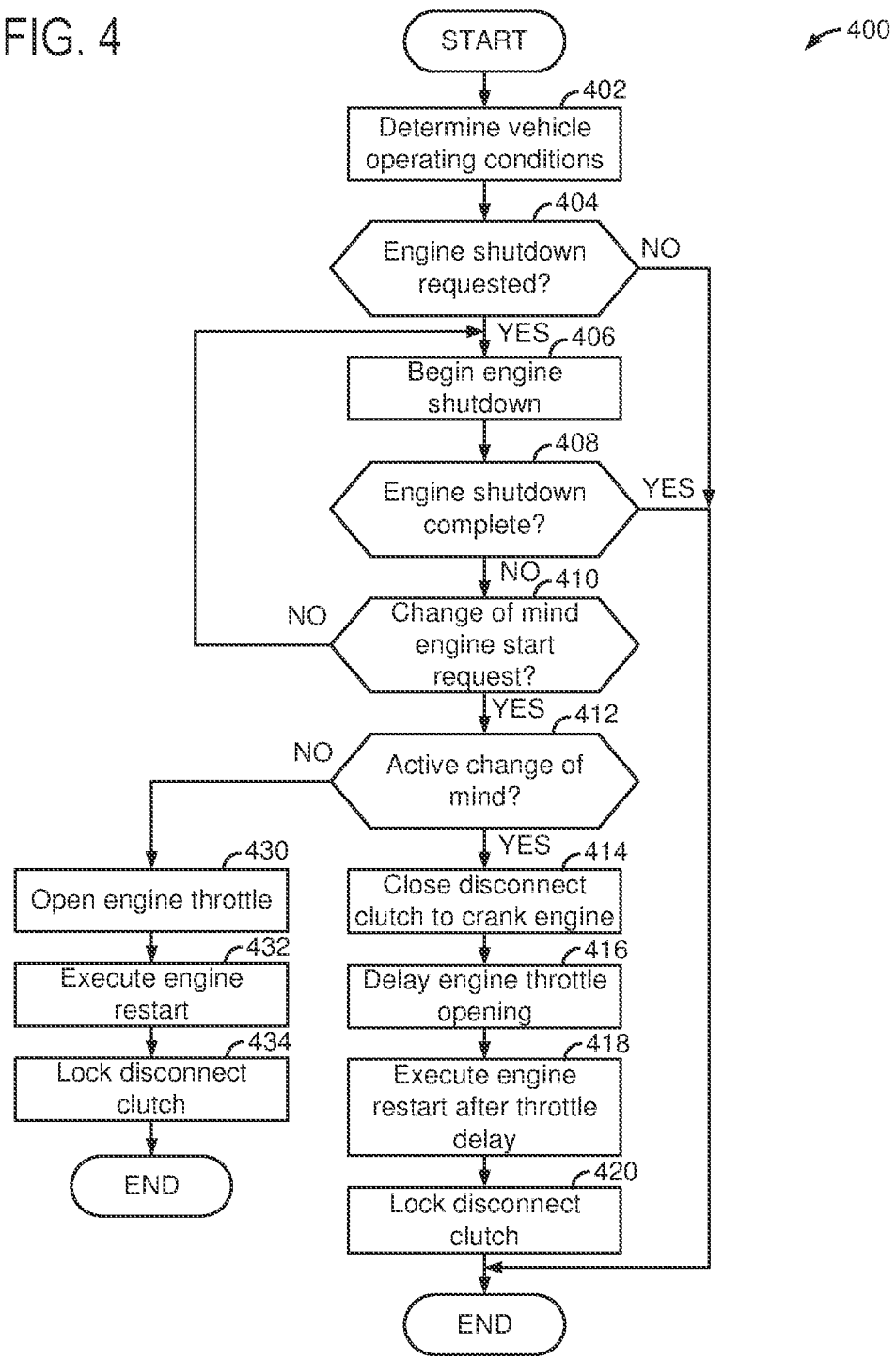
FIG. 4 shows a method for restarting an engine of a hybrid vehicle.

Referring now to FIG. 4, a method for operating a hybrid vehicle is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3. The vehicle's ISG may be providing torque to propel the vehicle in response to a driver demand torque or power while method 400 is being performed.

At 402, method 400 determines vehicle operating conditions. Vehicle operating conditions may be determined via receiving inputs as shown in FIGS. 1 and 2 into a controller. Vehicle operating conditions may include but are not limited to engine operating state, transmission fluid temperature, battery state of charge, catalyst temperature, ISG torque, driveline disconnect clutch state, ambient air temperature, engine speed, vehicle speed, and driver demand torque or power. Method 400 proceeds to 404 after vehicle operating conditions are determined.

At 404, method 400 judges whether or not and engine shutdown is requested. In one example, an engine shutdown may be automatically requested via a controller when driver demand torque is low and when battery state of charge is high. An engine shutdown may be requested when a vehicle in which the engine resides is moving or stationary. If method 400 judges that an engine shutdown is requested, the answer is yes and method 400 proceeds to 406. Otherwise, the answer is no and method 400 proceeds to exit.

At 406, method 400 begins shutting down the engine. In particular, method 400 ceases to inject fuel to the engine. Method 400 may also cease to deliver spark to the engine. Additionally, method 400 may completely close the engine's throttle and fully open the driveline disconnect clutch. Method 400 proceeds to 408.

At 408, method 400 judges whether or not the engine shutdown is complete. In one example, the engine shutdown may be complete when the rotational speed of the engine is zero. If method 400 judges that the engine shutdown is complete, the answer is yes and method 400 proceeds to exit. Otherwise, the answer is no and method 400 proceeds to 410.

At 410, method 400 judges whether or not there is a change of mind engine start request. A change of mind engine start request may be generated after the engine shutdown has begun. The engine's speed may be greater than zero when the change of mind engine start is requested, and the change of mind engine start may be requested via a vehicle system or based on actions of the vehicle operator. If method 400 judges that a change of mind engine start is requested, the answer is yes and method 400 proceeds to 412. Otherwise, method 400 judges that a change of mind engine start is not requested and method 400 returns to 406.

At 412, method 400 judges if active change of mind conditions are present. An active change of mind may refer to conditions when engine speed is less than a threshold speed (e.g., 450 revolutions/minute) and an engine start request is generated due to actions of a vehicle operator or system conditions. Once engine shutdown has begun, an engine start request may be automatically generated in response to active change of mind conditions that are manifest as engine speed being less than a threshold speed and a vehicle operator increasing a driver demand torque. Alternatively, an engine start request may be automatically generated in response to active change of mind conditions that include engine speed being less than a threshold speed and vehicle operator releasing brake pedal. If active change of mind conditions are present, the answer is yes and method 400 proceeds to 414. Otherwise, method 400 may determine that passive change of mind conditions are present. Passive change of mind conditions may be manifest as engine speed being greater than a threshold speed after the engine is shut down and a battery state of charge being less than a threshold state of charge. Further, passive change of mind conditions may include engine speed being less than a threshold speed and a temperature of an after treatment device being less than a threshold temperature or other conditions of the vehicle system where starting the engine may be beneficial. Method 400 may proceed to 430 when passive change of mind conditions are present and result in an engine start request.

At 430, method 400 immediately opens the engine's throttle to a position that is based on the driver demand torque or power. The driver demand torque or power may be determined from driver demand pedal position and vehicle speed. Method 400 proceeds to 432.

At 432, method 400 executes an engine start by partially closing the driveline disconnect clutch so that the ISG delivers a desired engine cranking torque. The cranking torque causes engine speed to increase. The engine is also supplied with fuel and spark. Method 400 proceeds to 434.

At 434, method 400 locks the driveline disconnect clutch such that a speed of a first side of the driveline disconnect clutch is within a threshold speed (e.g., 3 revolutions/minute) of a speed of a second side of the driveline disconnect clutch. Method 400 proceeds to exit.

At 414, method 400 at least partially closes the driveline disconnect clutch and delivers torque from the ISG (e.g., 240) to the engine. This may be referred to as cranking the engine since the engine may not be combusting air and fuel when the ISG begins to transfer torque to the engine. In one example, the ISG may provide torque to propel the vehicle while also providing torque to rotate the engine. The driveline disconnect clutch may be partially closed to provide a requested engine cranking torque to the engine via the ISG. In other examples, method 400 may at least partially close the driveline disconnect clutch so that the ISG may provide sufficient torque to increase engine speed above a speed range where resonance frequencies of the engine and driveline components exist. Method 400 proceeds to 416.

At 416, method 400 delays opening the throttle beginning from the time that the engine start is requested. In one example, method 400 may delay opening of the throttle and amount of time that is based on the following logic:

$$\text{If } ((N_{engine} < \text{threshold1}) \text{ AND } (DU < \text{threshold2})) \text{ then}$$
$$T_{delay,throttle} = f(TFT);$$
$$\text{else}$$
$$T_{delay,throttle} = 0.$$

where $N_{engine}$ is engine speed, threshold1 is a threshold engine speed, AND is a logical "and" operator, DU is an estimate of driver urgency, threshold2 is a driver urgency threshold level, f is a function that returns a throttle opening delay time, TFT is transmission fluid temperature, and $T_{delay,throttle}$ is the throttle opening delay time. In one example, the driver urgency value DU may be based on a rate of driver demand pedal change. If the driver demand pedal position increases by a large amount in a short period of time (e.g., more than 20% in less than 200 milliseconds), the value of DU may be large. If the driver demand pedal position increases by a small amount in a short period of time (e.g., less than 5% in 200 milliseconds), the value of DU may be small. Thus, the above logic provides a throttle opening delay time that is a function of transmission fluid temperature if engine speed is less than a threshold speed and driver urgency is less than a threshold level. Otherwise, the throttle opening delay is zero.

Method 400 may adjust the throttle opening delay time as a function of transmission fluid temperature because closing of the driveline disconnect clutch and torque transfer through the driveline disconnect clutch may be affected by transmission fluid temperature. The driveline disconnect clutch fluid-filling dynamics are relatively slower when TFT is small (e.g., less than 0 degrees Celsius), as compared to when TFT large. The slower dynamics are caused by the larger viscosity of the transmission fluid at lower temperatures. To compensate for fluid dynamics, $T_{delay,throttle}$ is set larger for smaller values of TFT so that the driveline disconnect clutch develops enough capacity to pull the engine outside, or close to outside, of the resonance speed zone, prior to re-opening the throttle.

Method 400 provides compensation for operating conditions that may be determined to be urgent. The urgency level may be based on the change in driver demand torque or power. For example, the driver urgency level may be determined via the following equation:

$$DU = g(DD)$$

where DU is a driver urgency level, g is a function that returns a driver urgency level, and DD is the driver demand torque or power.

Method 400 may reduce the throttle opening delay time to zero when urgent conditions are determined to be present. Method 400 interprets urgency as creating a higher tolerance for engine and driveline noise. Method 400 also provides compensation for engine speed. Specifically, method 400 allows for longer (e.g., 250 millisecond) throttle opening delay times when engine speed is at lower speeds (e.g., less than 400 revolutions per minute) and shorter throttle opening delay times when engine speed is high. Method 400 holds the engine throttle fully closed or at its present position for the amount of the throttle opening delay time, where the throttle opening delay time begins when the engine start is requested. Method 400 proceeds to 418.

At 418, method 400 executes an engine start by supplying the engine with fuel and spark. Method 400 proceeds to 420.

At 420, method 400 locks the driveline disconnect clutch such that a speed of a first side of the driveline disconnect clutch is within a threshold speed (e.g., 3 revolutions/minute) of a speed of a second side of the driveline disconnect clutch. Method 400 proceeds to exit.

In this way, an engine of a hybrid driveline may be started after the engine has been shut down, but before the engine rotational speed reaches zero. Delaying opening of the throttle may reduce engine torque pulsations, which may reduce a possibility of exciting driveline resonances.

Thus, the method of FIG. 4 provides for a method for operating a vehicle, comprising: shutting down an engine via a controller in response to an engine shutdown request; at least partially closing a driveline disconnect clutch and transferring torque from an integrated starter/generator to the engine after the engine shutdown request and before engine speed reaches zero following the engine shutdown request; and delaying an opening of an engine throttle while a speed of the engine is less than a threshold engine speed as the engine is being rotated via an integrated starter/generator. In a first example, the method further comprises opening a driveline disconnect clutch in response to the engine shutdown request. In a second example that may include the first example, the method further comprises closing the driveline disconnect clutch in response to an engine start request. In a third example that may include one or both of the first and second examples, the method includes where the opening of the engine throttle is delayed beginning from a time when the engine start request is asserted. In a fourth example that may include one or more of the first through third examples, the method includes where the opening of the engine throttle is delayed ending when the speed of the engine is greater than the threshold engine speed. In a fifth example that may include one or more of the first through fourth examples, the method includes where at least partially closing a driveline disconnect clutch is in response to the engine start request. In a sixth example that may include one or more of the first through fifth examples, the method includes where the engine start request is generated via a vehicle system. In a seventh example that may include one or more of the first through sixth examples, the method includes where the engine start request is generated via a vehicle operator releasing a brake pedal or increasing a driver demand.

The method of FIG. 4 also provides for a method for operating a vehicle, comprising: shutting down an engine via a controller in response to an engine shutdown request; at least partially closing a driveline disconnect clutch and transferring torque from an integrated starter/generator to the engine after the engine shutdown request and before engine speed reaches zero following the engine shutdown request; and delaying an opening of an engine throttle in response to an engine start request, where delaying the opening of the engine throttle includes not opening the engine throttle based on engine speed. In a first example, the method includes where delaying opening of the engine throttle includes not opening the throttle based on a driver urgency metric. In a second example, the method includes where delaying opening of the engine throttle includes opening the engine throttle at a time that is based on transmission fluid temperature. In a third example that may include one or both of the first and second examples, the method further comprises closing a driveline disconnect clutch in response to the engine start request. In a fourth example that may include one or more of the first through third examples, the method includes where the driveline disconnect clutch is closed before the engine throttle is opened.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted.

Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
shutting down an engine via a controller in response to an engine shutdown request;
at least partially closing a driveline disconnect clutch and transferring torque from an integrated starter/generator to the engine after the engine shutdown request and before engine speed reaches zero following the engine shutdown request; and
delaying an opening of an engine throttle while a speed of the engine is less than a threshold engine speed as the engine is being rotated via the integrated starter/generator.

2. The method of claim 1, further comprising opening a driveline disconnect clutch in response to the engine shutdown request.

3. The method of claim 2, further comprising closing the driveline disconnect clutch in response to an engine start request.

4. The method of claim 3, where the opening of the engine throttle is delayed beginning from a time when the engine start request is asserted.

5. The method of claim 4, where the opening of the engine throttle is delayed ending when the speed of the engine is greater than the threshold engine speed.

6. The method of claim 5, where at least partially closing the driveline disconnect clutch is in response to the engine start request.

7. The method of claim 6, where the engine start request is generated via a vehicle system.

8. The method of claim 6, where the engine start request is generated via a vehicle operator releasing a brake pedal or increasing a driver demand.

9. A system, comprising:
a vehicle including an engine;
an integrated starter/generator (ISG);
a driveline disconnect clutch positioned in a driveline between the engine and the ISG; and
a controller including executable instructions stored in non-transitory memory that cause the controller to rotate the engine via the ISG and delay an opening of a throttle in response to an engine start request, the engine start request generated after ceasing fuel flow to the engine and before an engine speed is zero.

10. The system of claim 9, where the opening of the throttle is delayed beginning at a time when the engine start request is initially asserted.

11. The system of claim 9, where the delay is based on a driver urgency metric.

12. The system of claim 9, where the delay is based on engine speed.

13. The system of claim 9, where the delay is a function of transmission fluid temperature.

14. The system of claim 9, further comprising opening the throttle in response to the engine speed.

15. The system of claim 14, where opening the throttle is performed when the engine speed exceeds a threshold speed.

16. A method for operating a vehicle, comprising:
shutting down an engine via a controller in response to an engine shutdown request;
at least partially closing a driveline disconnect clutch and transferring torque from an integrated starter/generator to the engine after the engine shutdown request and before engine speed reaches zero following the engine shutdown request; and
delaying an opening of an engine throttle in response to an engine start request, where delaying the opening of the engine throttle includes not opening the engine throttle based on engine speed.

17. The method of claim 16, where delaying opening of the engine throttle includes not opening the engine throttle based on a driver urgency metric.

18. The method of claim 17, where delaying opening of the engine throttle includes opening the engine throttle at a time that is based on transmission fluid temperature.

19. The method of claim 16, further comprising closing a driveline disconnect clutch in response to the engine start request.

20. The method of claim 19, where the driveline disconnect clutch is closed before the engine throttle is opened.

* * * * *